United States Patent
Bresser et al.

(10) Patent No.: US 9,620,775 B2
(45) Date of Patent: Apr. 11, 2017

(54) METHOD FOR PRODUCING CARBON-COATED METAL-DOPED ZINC OXIDE ARTICLES AND THE USE THEREOF

(71) Applicant: WESTFÄLISCHE WILHELMS-UNIVERSITÄT MÜNSTER, Münster (DE)

(72) Inventors: Dominic Bresser, Münster (DE); Franziska Müller, Münster (DE); Elie Paillard, Münster (DE); Martin Winter, Münster (DE); Stefano Passerini, Münster (DE)

(73) Assignee: WESTFÄLISCHE WILHELMS-UNIVERSITÄT MÜNSTER, Münster (DE)

( * ) Notice: Subject to any disclaimer, the term of this patent is extended or adjusted under 35 U.S.C. 154(b) by 160 days.

(21) Appl. No.: 14/419,898

(22) PCT Filed: Aug. 5, 2013

(86) PCT No.: PCT/EP2013/066354
§ 371 (c)(1),
(2) Date: Feb. 5, 2015

(87) PCT Pub. No.: WO2014/023680
PCT Pub. Date: Feb. 13, 2014

(65) Prior Publication Data
US 2015/0214541 A1     Jul. 30, 2015

(30) Foreign Application Priority Data
Aug. 6, 2012   (DE) ............... 10 2012 107 199 U

(51) Int. Cl.
*H01M 4/36*   (2006.01)
*H01G 11/50*  (2013.01)
(Continued)

(52) U.S. Cl.
CPC ............ *H01M 4/366* (2013.01); *B82Y 30/00* (2013.01); *C01G 9/00* (2013.01); *C01G 9/02* (2013.01);
(Continued)

(58) Field of Classification Search
None
See application file for complete search history.

(56) References Cited

U.S. PATENT DOCUMENTS

| 6,855,273 B2 | 2/2005 | Ravet et al. |
| 2006/0018816 A1 * | 1/2006 | Nause .............. C01G 9/02 423/324 |
| 2007/0154561 A1 | 7/2007 | Takeda et al. |

FOREIGN PATENT DOCUMENTS

| DE | 60037609 T2 | 1/2009 |
| EP | 2361887 * | 8/2011 |

(Continued)

OTHER PUBLICATIONS

International Search Report issued in corresponding International Application No. PCT/EP2013/066354, dated Oct. 30, 2013.
(Continued)

*Primary Examiner* — Ula C Ruddock
*Assistant Examiner* — Matthew Van Oudenaren
(74) *Attorney, Agent, or Firm* — Davidson, Davidson & Kappel, LLC

(57) ABSTRACT

The invention relates to a method for producing carbon-coated, transition metal-doped zinc oxide particles and the use thereof as electrode material for alkali metal ion batteries and, in particular, lithium ion batteries.

14 Claims, 9 Drawing Sheets

(51) Int. Cl.

| | |
|---|---|
| *H01M 10/0525* | (2010.01) |
| *H01M 4/04* | (2006.01) |
| *H01M 4/485* | (2010.01) |
| *H01M 4/505* | (2010.01) |
| *H01M 4/525* | (2010.01) |
| *H01M 4/62* | (2006.01) |
| *H01M 6/14* | (2006.01) |
| *C01G 9/00* | (2006.01) |
| *C01G 9/02* | (2006.01) |
| *C09C 1/04* | (2006.01) |
| *B82Y 30/00* | (2011.01) |
| *H01M 4/38* | (2006.01) |
| *H01M 4/42* | (2006.01) |
| *H01M 4/52* | (2010.01) |

(52) U.S. Cl.
CPC ............... *C09C 1/04* (2013.01); *C09C 1/043* (2013.01); *H01G 11/50* (2013.01); *H01M 4/049* (2013.01); *H01M 4/0416* (2013.01); *H01M 4/0471* (2013.01); *H01M 4/485* (2013.01); *H01M 4/505* (2013.01); *H01M 4/525* (2013.01); *H01M 4/625* (2013.01); *H01M 6/14* (2013.01); *H01M 10/0525* (2013.01); *C01P 2002/52* (2013.01); *C01P 2002/72* (2013.01); *C01P 2002/76* (2013.01); *C01P 2004/03* (2013.01); *C01P 2004/64* (2013.01); *C01P 2006/12* (2013.01); *C01P 2006/40* (2013.01); *H01M 4/362* (2013.01); *H01M 4/364* (2013.01); *H01M 4/38* (2013.01); *H01M 4/42* (2013.01); *H01M 4/52* (2013.01)

(56) References Cited

FOREIGN PATENT DOCUMENTS

| | | |
|---|---|---|
| EP | 2361887 A1 | 8/2011 |
| WO | WO 99/60994 A1 | 12/1999 |
| WO | WO2010058901 * | 5/2010 |
| WO | WO 2010/114561 A1 | 10/2010 |

OTHER PUBLICATIONS

J. Liu, Y. Li, R. Ding, J. Jiang, Y. Hu, X. Ji, Q. Chi, Z., Zhu, X. Huang: "Carbon/ZnO Nanorod Array Electrode with Significantly Improves Lithium Storage Capability", J. Phys. Chem. C, Bd. 113, 5336-5339 (Nov. 3, 2009).

* cited by examiner a)

b)

a)

b)

a)

b)

a)

b)

a)

b)

METHOD FOR PRODUCING CARBON-COATED METAL-DOPED ZINC OXIDE ARTICLES AND THE USE THEREOF

This application is a U.S. national phase application under 35 U.S.C. of §371 of International Application No. PCT/EP2013/066354, filed Aug. 5, 2013, which claims priority to DE10 2012 107 199.3, filed on Aug. 6, 2012; the disclosures of which are all hereby incorporated by reference herein.

FIELD OF THE INVENTION

The invention relates to a method for producing carbon-coated metal oxide particles and also to their use as electrode material for lithium ion batteries.

BACKGROUND OF THE INVENTION

Lithium ion batteries currently constitute the leading technology within the field of rechargeable batteries, and they dominate the battery market for portable electronics. Applications for lithium ion batteries in electrical vehicles or in storage technologies for wind or solar energy, for example, nevertheless necessitate the development of rechargeable battery technologies and active materials having significantly higher specific energies and capacities than have hitherto been available commercially or at all. There is therefore need not only for an improvement of existing electrode materials, but also for development of new materials with suitability as the active material for lithium ion batteries.

New electrode materials follow in principle two different mechanisms of lithium acceptance, either the reversible formation of an alloy with lithium, as in the case of silicon, tin, antimony, aluminum, or zinc, or the so-called conversion reactions, such as for cobalt oxide, nickel oxide, iron oxide, or copper oxide, for example. Alloy-forming materials, however, suffer severe changes in volume as a result of lithium acceptance and release, thereby destroying the material and causing a loss of electronic contact between active material and current collector. Nevertheless, materials which form reversibly alloys with lithium are currently viewed as the more promising for short-term industrial applications. In 2005, for example, Sony announced the marketing of the Nexelion™ battery, which is based on an Sn—Co—C composite as anode material. Research is presently focused on silicon-based or tin-based electrode materials, whereas zinc, as a potential replacement for the graphite normally used commercially as anode material, is finding little attention, despite promising results achieved with ZnO—$Fe_2O_3$—, $ZnO_{1-x}S_x$—, and $Al_2O_3$-doped thin-film ZnO structures. However, the electrodes in question have been produced by means of complex methods such as magnetron sputtering, and only thin layers of the active material are characterized. These layers are poorly suited as active material for lithium ion cells with high energy density. Apart from the less-suitable methods of electrode production for industrial applications, furthermore, the materials exhibit an inadequate specific capacity. Moreover, the irreversible formation of $Li_2O$ in the first cycle leads to a loss of capacity.

Specification U.S. Pat. No. 3,330,697 further describes the so-called Pecchini process for producing perowskitic compounds. Disadvantages of this, however, include firstly the volume expansion that occurs and secondly the formation of nitrogen-containing gases in the course of this combustion-based synthesis process starting from metal nitrates.

SUMMARY OF THE INVENTION

It was an object of the present invention, accordingly, to provide a method for producing a ZnO-based electrode material that is suitable for use as electrode material with enhanced specific capacity and cycling stability in a lithium ion battery.

This object is achieved by a method for producing carbon-coated particles of $M_xZn_{1-x}O$ wherein M is a transition metal selected from the group comprising Fe, Co, Ni, Mn and/or Cu and $0.02 \leq x \leq 0.14$, comprising the following steps:
  a) mixing stoichiometric amounts of a Zn salt and of a transition metal salt with a sugar in a solvent;
  b) drying the mixture from step a);
  c) calcining the dried mixture from step b);
  d) mixing the $M_xZn_{1-x}O$ particles obtained from step c) with a sugar in a solvent;
  e) carbonizing the mixture from step d).

The method of the invention provides a simple and cost-effective synthesis opportunity for carbon-coated, transition metal-doped zinc oxide particles having a size in the nanometer range. The steps of the method can be performed under mild conditions and without costly and inconvenient apparatus-based operations. This further permits an industrial implementation that is easily realizable. Especially in comparison to the known wet-chemical Pecchini process for producing perowskitic materials, which uses nitrate solutions in a stoichiometric mixture, the expansion in volume can be reduced by the sole use of sugar as growth inhibitor for the particles. In addition it is possible to avoid the disadvantage of the formation of nitrogen-containing gases in combustion-based synthesis processes starting from metal nitrates.

It has further been found, surprisingly, that the use of carbon-coated particles of $M_xZn_{1-x}O$ wherein M is a transition metal selected from the group comprising Fe, Co, Ni, Mn and/or Cu and $0.02 \leq x \leq 0.14$ as electrode material, more particularly for lithium-based energy storage devices, can provide, these being distinguished by a significantly increased specific capacity and superior cycling stability relative to the use of zinc oxide.

The term "calcining" refers in the sense of the present invention, generally, to a thermal treatment step in the presence of oxygen, such as in the presence of air, for example; in other words, the heating of a material with the goal of its decomposition. The material to be decomposed is the sugar in accordance with the invention. The term "carbonizing" refers in the sense of the present invention to a thermal treatment step for converting a carbon source, more particularly a sugar as carbon-containing starting material, into a carbon-containing residue in the absence of oxygen or hydrogen.

The method is more particularly a method for producing an electrode material, more particularly for lithium-based energy storage devices, comprising carbon-coated particles of $M_xZn_{1-x}O$ wherein M is a transition metal selected from the group comprising Fe, Co, Ni, Mn and/or Cu and $0.02 \leq x \leq 0.14$.

The term "particle" is used in the sense of the present invention synonymous to "particle". The term "$M_xZn_{1-x}O$ particles" refers in the sense of the present invention to zinc oxide compounds doped with the transition metal M. The ratio of transition metal M to zinc here may be in the range from $x \geq 0.02$ to $\leq 0.14:1-x$, preferably in the range from $x \geq 0.05$ to $\leq 0.13:1-x$, more particularly 0.1:0.9. The ratio of transition metal M to zinc, more particularly of iron to zinc, may also be in the range from x≥0.04 to ≤0.13:1-x, preferably in the range from x≥0.06 to ≤0.12:1-x.

The term "stoichiometric amount" refers in the sense of the present invention to the amount of the zinc salt and transition metal salt required in each case, in accordance with the ratio of the equivalent weights, for producing the respective $M_xZn_{1-x}$ oxide. To produce $M_{0.1}Zn_{0.9}O$, accordingly, 0.9 mol of zinc(II) gluconate and 0.1 mol of iron gluconate were used.

The salts of zinc and transition metal are preferably water-soluble organic salts. Organic salts have the advantage that the organic counterion can be removed from the reactant mixture at the calcining stage, more particularly in the form of carbon dioxide. The term "water-soluble" in the sense of the present invention means that the salt can be dissolved to an extent of at least 0.5 mol/l in water. Preference is given to readily soluble salts having a solubility of greater than 1 mol/l. In preferred embodiments of the method, the salts of zinc and transition metal are an organic salt selected from the group comprising gluconates, citrates, acetates, formates, butyrates, lactates, glycolates, tartrates, propionates and/or succinates. Preference is given to gluconates, citrates, and acetates, more particularly gluconates. Zinc gluconates and transition metal gluconates are readily soluble in water.

The sugar is preferably a mono-, di- or polysaccharide, more particularly selected from the group comprising glucose, fructose, sucrose, lactose, starch, cellulose and/or derivates thereof. Especially preferred is sucrose. Sugars dissolve well in water. The water-soluble di- or monosaccharides such as sucrose and lactose and also glucose and fructose are therefore preferred.

The solvent is preferably water. With preference no citric acid is added to the sugar solution. This has the advantage that there is a lower expansion in volume in the course of calcining. It has further been found that when water is used as solvent, without addition of citric acid, smaller particles have been obtainable that with addition of citric acid. It has also been possible to record a lower level of agglomeration of the particles.

For example, first of all solutions of the sugar and of the separately or jointly dissolved salts in the solvent can be prepared, and then the solution of the metal salts can be added to the sugar solution. It is preferred for stoichiometric amounts of the zinc salt and of the transition metal salt to be dissolved jointly. The sugar is preferably dissolved in small amounts of water, to give a viscous solution. The ratio of the concentration of the metal ions and of the sugar is preferably in the range from 1:1 to 1:50, preferably in the range from 1:2 to 1:20, more preferably in the range from 1:4 to 1:10, more particularly 1:6. A ratio of 1:6 has emerged as being an especially suitable ratio for achieving particle growth in the desired size range and preventing oxidation of the transition metals.

The mixing may take place at ambient or room temperature. The drying of the mixture prior to calcining takes place preferably at a temperature in the range from ≥70° C. to ≤300° C., more preferably in the range from 120° C. to ≤300° C., very preferably in the range from ≥150° C. to ≤300° C. Drying may be performed in the air. Drying before calcining has the advantage that there is no further expansion in volume during the calcining of the dried mixture. Prior to drying, the solvent can first of all be evaporated, at 150° C. to 180° C., for example. By this means the sugar can be dehydrated.

As a result of the calcining, the sugar and also the organic anions of the metal salts are removed from the mixture, and zinc oxide particles doped with the transition metal of the formula $M_xZn_{1-x}O$, are formed. In preferred embodiments, the calcining is performed at a temperature in the range from ≥300° C. to ≤500° C., preferably in the range from ≥350° C. to ≤450° C., more preferably in the range from ≥400° C. to ≤450° C. These temperatures are able to ensure that reduction of the metal cations to the pure metal can be avoided.

Advantageously in this way it is possible to obtain transition metal-doped zinc oxide particles having a size in the nanometer range. The particles preferably have a spherical or ball shape. More particularly, the transition metal-doped zinc oxide particles can have an average diameter in the range from ≥10 nm to ≤200 nm, preferably in the range from ≥15 nm to ≤50 nm, more preferably in the range from ≥20 nm to ≤30 nm. The term "average diameter" refers to the average value of all diameters or arithmetically averaged diameters, relative to all particles. Particles having a size in the nanometer range are able to provide high specific surface area. This permits a large contact area of the particles with an electrolyte, and hence a large number of possible reaction sites with the $Li^+$ ions present in the electrolyte.

The calcined particles may optionally be comminuted or pulverized, in a mortar, for example.

Without being tied to any particular theory, it is assumed that the sugar as growth inhibitor brings about the formation of transition metal-doped zinc oxide having a particle size in the nanometer range. The transition metal-doped zinc oxide particles obtained from the calcining can be used as electrode material. It is nevertheless preferable for the particles to be provided with a carbon coating in the ongoing method. A carbon coating leads advantageously to a significant enhancement of the electronic conductivity of the material.

For this purpose, the $M_xZn_{1-x}O$ particles can again be mixed with a sugar in a solvent. The sugar is preferably a mono-, di-, or polysaccharide, more particularly selected from the group comprising glucose, fructose, sucrose, lactose, starch, cellulose and/or derivatives thereof. Especially preferred is sucrose. It is preferable to use the same sugar for calcining and carbonizing. The solvent is preferably water. For example, the sugar can be dissolved in the solvent and then the transition metal-doped zinc oxide particles can be added and dispersed with the sugar dispersed in the solvent. The term "dispersing" means the mixing of at least two substances which undergo little or no dissolution in one another or chemical bonding with one another, an example being the distribution of the particles as a disperse phase in a sugar solution as a continuous phase. A distribution as uniform as possible of the particles in an aqueous sugar solution is preferred, in order to obtain as uniform as possible wetting of the particles with the sugar. The dispersing may be performed, for example, in a ball mill, over a period of 1 to 2 hours, as for example for 1.5 hours. The sugar is preferably dissolved in small amounts of water, to give a viscous solution. Sugar and transition metal-doped zinc oxide particles are preferably mixed in a ratio by mass in the range from 1:50 to 10:1, more preferably in the range from 1:10 to 2:1, very preferably in the range from 1:2 to 1:1, more particularly at 3:4.

The mixture is preferably dried before the carbonizing. By this means the sugar can be dehydrated. Drying may take place at a temperature in the range from ≥18° C. to ≤100° C., preferably in the range from ≥20° C. to ≤80° C., more preferably in the range from ≥23° C. to ≤50° C. Drying may be performed in particular at ambient temperature, as for example in the range from ≥18° C. to ≤23° C. The drying may be carried out in the air. The dried mixture may optionally then be comminuted or pulverized in a mortar, for example. By this means, sugar-wetted particles which have undergone sticking or clumping as a result of the drying can be parted from one another again.

Thereafter the mixture is carbonized. The carbonizing forms a carbon coating on the transition metal-doped zinc oxide particles. The carbonizing is preferably performed under an inert gas atmosphere, of argon, nitrogen, or mixtures thereof, for example. By this means it is possible to prevent unwanted secondary reactions such as oxidation of the carbon coating. In preferred embodiments the carbonizing is performed at a temperature in the range from ≥350° C. to ≤700° C., preferably in the range from ≥400° C. to ≤600° C., more preferably in the range from ≥450° C. to ≤550° C. Advantageously, these conditions are mild, and so there is no further reduction of the doped zinc oxides. The temperatures and conditions are more particularly selected such that both zinc and the transition metal are not reduced to the pure metals.

The carbonizing may be performed, for example, for a period in the range from ≥1 h to ≤24 h, preferably in the range from ≥2 h to ≤12 h, preferably in the range from ≥3 h to ≤6 h. After the carbonizing, the carbon-coated particles obtained may be comminuted or pulverized, by mortaring, for example.

The method using sugar provides, in particular, a mild method for producing carbon-coated $M_xZn_{1-x}O$ particles. The method further has the advantage of releasing only $CO_2$, which is nontoxic. With sugar as carbon source and water as solvent, favorable starting materials can be used. Moreover, the method does not require any costly and inconvenient apparatus, meaning that industrial application can be realized easily and quickly.

The carbon-coated $M_xZn_{1-x}O$ particles can be used in particular as electrode material for the production of anodes for lithium ion batteries.

The carbon coating applied by the carbonizing results advantageously in a significant increase in the electronic conductivity of the material. This is a great advantage particularly for subsequent use as electrode material in lithium ion batteries, since it enables very good to good charge states of the active material to be achieved even in the case of very high applied current densities. Furthermore, the carbon coating is able to act as a buffer for the volume expansion and volume reduction which occur in the course of lithiation and dilithiation. This raises the cycling stability of the electrode and results in a higher achievable cycle number at virtually constant capacity. Furthermore, the carbon coating not only contributes to a significant improvement in the electronic conductivity, but also is electrochemically active itself within the potential range utilized, and is able to store lithium ions. The carbon cladding, moreover, prevents physical contact of the nanoparticles and therefore actively counteracts particle agglomeration in the course of electrode production and cycling.

A particular advantage is that sucrose can be converted to amorphous carbon by the carbonizing procedure. Amorphous carbon not only possesses a high electronic conductivity, but at the same time is permeable to the electrolyte and to the lithium ions. Furthermore, amorphous carbon is especially suitable for cushioning an expansion in volume of the particles during the charging and discharge of the electrodes.

A further subject of the invention relates to carbon-coated particles, obtainable by the method of the invention, of $M_xZn_{1-x}O$ wherein M is a transition metal selected from the group comprising Fe, Co, Ni, Mn and/or Cu and 0.02≤x≤0.14.

As active material, the carbon-coated $M_xZn_{1-x}O$ particles obtainable with the method of the invention are notable for superior cycling stability in the electrodes produced from them, and significantly increased specific capacity and significantly reduced loss of capacity in the first cycle, relative to the use of zinc oxide. Moreover, electrodes based on the use of $M_xZn_{1-x}O$ particles, and more particularly those based on the use of carbon-coated $M_xZn_{1-x}O$ particles, as active material, exhibit a superior specific capacity for increasing applied current densities, which are higher by a factor of around three than those achievable when using ZnO. In comparison to graphite as well, which is presently the most widely used anode material, specific capacities which are more than twice as high can be achieved for a wide bandwidth of applied current densities.

In the $M_xZn_{1-x}O$ particles, x is between 0.02 and 0.14. Higher proportions of transition metal can lead to a phase transition of the doped zinc oxide particles in the course of calcining. The ratio of transition metal M to zinc may be preferably in the range from x≥0.05 to ≤0.13:1-x, more particularly 0.1:0.9. The transition metal M is preferably iron or cobalt. The ratio of transition metal M to zinc, more particularly of iron to zinc, may also be in the range from x≥0.04 to ≤0.13:1-x, preferably in the range from x≥0.06 to ≤0.12:1-x. Particularly preferred particles are carbon-coated $Co_{0.1}Zn_{0.9}O$ and $Fe_{0.1}Zn_{0.9}O$ particles. Further particularly preferred particles are carbon-coated $Co_{0.12}Zn_{0.88}O$ and $Fe_{0.12}Zn_{0.88}O$ particles. It has been found, for example, that in the range 0.02≤x≤0.12, the iron fraction was advantageous for the achievable specific capacity and discharge rate. Overall, a transition metal fraction with these ranges, more particularly of 0.02≤x≤0.12 is advantageous for an electrode produced from this material.

The fraction of carbon, based on the total weight of the carbon-coated $M_xZn_{1-x}O$ particles, is preferably in the range from 0.5 wt % to ≤70 wt %, preferably in the range from 2 wt % to ≤30 wt %, more preferably in the range from ≥5 wt % to ≤20 wt %. It has been found that in a range from ≥5 wt % to ≤20 wt % of carbon, with increasing carbon content, the density and crystallinity and also the specific surface area showed an advantageous combination, especially in the range from ≥12 wt % to ≤20 wt % of carbon. The carbon-coated particles preferably have a BET surface area in the range from ≥1 $m^2/g$ to ≤200 $m^2/g$, more preferably in the range from ≥50 $m^2/g$ to ≤150 $m^2/g$, very preferably in the range from ≥70 $m^2/g$ to ≤130 $m^2/g$.

Advantageously there is no substantial increase in the average diameter of the transition metal-doped zinc oxide particles as a result of the carbonizing procedure. Hence the carbon-coated, transition metal-doped zinc oxide particles can have an average diameter in the range from ≥15 nm to ≤250 nm, preferably in the range from ≥20 nm to ≤80 nm, more preferably in the range from ≥25 nm to ≤50 nm.

The invention further relates to the use of $M_xZn_{1-x}O$ particles, more particularly of carbon-coated particles of $M_xZn_{1-x}O$ wherein M is a transition metal selected from the group comprising Fe, Co, Ni, Mn and/or Cu and 0.02≤x≤0.14, as electrode material for electrochemical energy storage devices, more particularly alkali metal ion batteries or supercapacitors.

A further subject of the invention relates to an electrode material for electrochemical energy storage devices, more particularly alkali metal ion batteries or supercapacitors, comprising $M_xZn_{1-x}O$ particles, more particularly carbon-coated particles of $M_xZn_{1-x}O$ wherein M is a transition metal selected from the group comprising Fe, Co, Ni, Mn and/or Cu and 0.02≤x≤0.14.

A further subject of the invention relates to an electrode comprising $M_xZn_{1-x}O$ particles, more particularly carbon-coated particles of $M_xZn_{1-3}O$ wherein M is a transition metal selected from the group comprising Fe, Co, Ni, Mn and/or Cu and $0.02 \leq x \leq 0.14$.

Electrodes just comprising particles of $M_xZn_{1-3}O$ wherein M is a transition metal selected from the group comprising Fe, Co, Ni, Mn and/or Cu and $0.02 \leq x \leq 0.14$ are notable for an increased specific capacity, improved cycling stability and a reduced irreversible capacity loss at the start, relative to the use of zinc oxide. More particularly, electrodes comprising carbon-coated $M_xZn_{1-x}O$ particles are notable for a further significant increase in the specific capacity and in the cycling stability, and also for reduced irreversible capacity loss at the start.

In the $M_xZn_{1-x}O$ particles, x is between 0.02 and 0.14. The ratio of transition metal M to zinc may be preferably in the range from $x \geq 0.05$ to $\leq 0.13:1-x$, more particularly 0.1:0.9. The transition metal M is preferably iron or cobalt. The ratio of transition metal M to zinc, more particularly of iron to zinc, may also be in the range from $x \geq 0.04$ to $\leq 0.13:1-x$, preferably in the range from $x \geq 0.06$ to $\leq 0.12:1-x$. Particularly preferred particles are carbon-coated $Co_{0.1}Zn_{0.9}O$ and $Fe_{0.1}Zn_{0.9}O$ particles. The fraction of carbon, based on the total weight of the carbon-coated $M_xZn_{1-x}O$ particles, is preferably in the range from 0.5 wt % to $\leq 70$ wt %, preferably in the range from 2 wt % to $\leq 30$ wt %, more preferably in the range from $\geq 5$ wt % to $\leq 20$ wt %. The carbon-coated particles preferably have a BET surface area in the range from $\geq 1$ m$^2$/g to $\leq 200$ m$^2$/g, more preferably in the range from $\geq 50$ m$^2$/g to $\leq 150$ m$^2$/g, very preferably in the range from $\geq 70$ m$^2$/g to $\leq 130$ m$^2$/g. Additionally the carbon-coated, transition metal-doped zinc oxide particles can have an average diameter in the range from $\geq 15$ nm to $\leq 250$ nm, preferably in the range from $\geq 20$ nm to $\leq 80$ nm, more preferably in the range from $\geq 25$ nm to $\leq 50$ nm.

For the description of the particles, reference is made to the description above. These particles form the material of the electrode which is commonly identified as active material and which carries out, for example, reversible acceptance and release of lithium. This material may further comprise binders and additives. Correspondingly, the active material of an electrode may be formed from the particles or consist substantially thereof. The active material is usually applied to a metal foil, such as a copper foil or aluminum foil, for example, or to a carbon-based current collector foil which acts as a current collector. Since the active material accounts for the substantial part of the electrode, the electrode may in particular also be formed of or based on $M_xZn_{1-x}O$ particles, more particularly carbon-coated $M_xZn_{1-x}O$ particles. An electrode of this kind is commonly referred to as a composite electrode. In preferred embodiments the electrode is a composite electrode comprising $M_xZn_{1-x}O$ particles, more particularly carbon-coated $M_xZn_{1-x}O$ particles, binder, and optionally conductive carbon.

In the case of carbon-coated $M_xZn_{1-x}O$ particles there is no need to use additional carbon for producing an electrode. Advantageously, the carbon network of the carbon coating is able to provide sufficient electrical conductivity on the part of the electrode. Provision may be made, however, to add further carbon for producing an electrode. This allows the conductivity of the electrode to be increased further.

Carbon may also be added prior to carbonizing, and may for example be dispersed in the sugar solution together with the $M_xZn_{1-x}O$ particles themselves. Preference is given to adding carbon only during the production of an electrode.

With preference, conductive carbon can be added at a weight ratio of particles to carbon in the range from $\geq 1:10$ to $\leq 40:1$, preferably in the range from $\geq 7:3$ to $\leq 20:1$, and especially particularly at a weight ratio in the range from $\geq 3:1$ to $\leq 4:1$. Examples of preferred carbon-containing materials are carbon black, synthetic or natural graphite, graphene, carbon nanoparticles, fullerenes, or mixtures thereof. One carbon black which can be used is available, for example, under the trade name Ketjenblack®. A carbon black which can be used with preference is available, for example, under the trade name Super P® and Super P Li®. The carbon-containing material may have an average particle size in the range from 1 nm to 500 μm, preferably from 5 nm to 1 μm, more preferably in the range from 10 nm to 60 nm. The average diameter of the carbon particles may 20 μm or less, preferably 15 μm or less, more preferably 10 μm or less, very preferably in the range from 10 nm to 60 nm.

The fraction of uncoated or carbon-coated $M_xZn_{1-x}O$ particles, based on the total weight of particles, binder, and conductive carbon, is preferably in the range from $\geq 10$ wt % to $\leq 98$ wt %, more preferably in the range from 50 wt % to $\leq 95$ wt %, very preferably in the range from $\geq 75$ wt % to $\leq 85$ wt %. The fraction of added conductive carbon based on the total weight of the composite electrode made up of uncoated or carbon-coated $M_xZn_{1-x}O$ particles, binder, and conductive carbon, is preferably in the range from $\geq 0$ wt % to $\leq 90$ wt %, more preferably in the range from 2 wt % to $\leq 50$ wt %, very preferably in the range from $\geq 5$ wt % to $\leq 20$ wt %.

The composite electrode may further comprise binders. Suitable binders are, for example, poly(vinylidene difluoride-hexafluoropropylene) (PVDF-HFP) copolymer, polyvinylidene fluoride (PVDF), polyethylene oxide (PEO), styrene-butadiene rubber (SBR), carboxymethylcellulose (CMC), as for example sodium carboxymethylcellulose (Na-CMC), or polytetrafluorethylene (PTFE) and cellulose, more particularly natural cellulose, and also suitable combinations of different binders. A preferred binder is carboxymethylcellulose (CMC), such as sodium carboxymethylcellulose (Na-CMC). The composite electrode preferably comprises carboxymethylcellulose as binder. Carboxymethylcellulose is more eco-friendly and more cost-effective by comparison with binders used in customary commercial batteries. In particular, carboxymethylcellulose is water-soluble. Hence carboxymethylcellulose permits the use of water as a dispersion medium for electrode production. Furthermore, in contrast to the use of fluorene-containing binders, carboxymethylcellulose allows easy recycling of the electrode materials at the end of the life cycle of the batteries, by pyrolysis. The composite electrode, based on the total weight of uncoated or carbon-coated $M_xZn_{1-x}O$ particles, binder, and optionally conductive carbon, preferably has a binder fraction in the range from $\geq 1$ wt % to $\leq 50$ wt %, more preferably in the range from $\geq 2$ wt % to $\leq 15$ wt %, more preferably in the range from $\geq 3$ wt % to $\leq 10$ wt %. For example, the fraction of binder may be 5 wt %, based on the total weight. The dry weight of a mixture of uncoated or carbon-coated $M_xZn_{1-x}O$ particles, binder, and conductive carbon may for example have 75 wt % of carbon-coated $M_xZn_{1-x}O$ particles, 20 wt % of conductive carbon black, and 5 wt % of binder, carboxymethylcellulose for example, based on the total weight of the mixture.

The production of an electrode may comprise the steps of mixing the uncoated or carbon-coated $M_xZn_{1-x}O$ particles with carbon black, and mixing the solids mixture with a binder in solution in solvent—for example, carboxymethylcellulose in solution in water—and applying the mixture to a conductive substrate, and drying the resulting electrodes.

The mixture may be applied, for example, with a wet film thickness in the range from ≥20 μm to ≤2 mm, preferably in the range from ≥90 μm to ≤500 μm, more preferably in the range from ≥100 μm to ≤200 μm. The surface coverage of the electrode may be in the range from ≥0.2 mg cm$^{-2}$ to ≤30 mg cm$^{-2}$, preferably in the range from ≥1 mg cm$^{-2}$ to ≤150 mg cm$^{-2}$, more preferably in the range from ≥2 mg cm$^{-2}$ to ≤10 mg cm$^{-2}$.

A further subject of the invention relates to an electrochemical energy storage device, more particularly an alkali metal ion battery or a supercapacitor, preferably primary lithium batteries, primary lithium ion batteries, secondary lithium ion batteries, primary lithium polymer batteries, or lithium ion capacitors, comprising an electrode of the invention.

The term "electrochemical energy storage device" encompasses single-use batteries (primary storage cells) and rechargeables (secondary storage cells). In the general terminology, however, rechargeables are frequently designated likewise using the term "battery", which is widely used as a generic term. For example, the term "lithium ion battery" is used synonymously with "rechargeable lithium ion battery". Lithium-based energy storage devices are preferably selected from the group comprising primary lithium batteries, primary lithium ion batteries, secondary lithium ion batteries, primary lithium polymer batteries, or lithium ion capacitors. Preference is given to primary and secondary lithium ion batteries.

Furthermore, however, the transition metal-doped zinc oxide particles can also be used independently of electrochemical energy storage devices. A further subject of the invention relates to the use of particles of $M_xZn_{1-x}O$ wherein M is a transition metal selected from the group comprising Fe, Co, Ni, Mn and/or Cu and 0.02≤x≤0.14 as color pigment for ceramic materials or applications. In particular, $Fe_xZn_{1-x}O$ and $Co_xZn_{1-x}O$ particles are highly suitable for use as color pigments, on account of their intense yellow-orange and/or green color.

Examples and figures which serve for illustrating the present invention are indicated hereinafter.

BRIEF DESCRIPTION OF THE DRAWINGS

The figures, in this context, show the following:

FIG. 1a) shows the X-ray diffractogram of the $Fe_{0.1}Zn_{0.9}O$ particles and also the signals of the JCPDS files of $Co_{0.15}Zn_{0.85}O$; FIG. 1b) shows that of the carbon-coated $Fe_{0.1}Zn_{0.9}O$ particles, and also, likewise, the signals of the JCPDS file for $Co_{0.15}Zn_{0.85}O$.

DETAILED DESCRIPTION OF THE INVENTION

Example 1

Production of Carbon-Coated $Fe_{0.1}Zn_{0.9}O$ Particles a) Production of $Fe_{0.1}Zn_{0.9}O$ Particles Stoichiometric amounts of 8.204 g of zinc(II) gluconate hydrate (ABCR, 97% purity) and 0.965 g of iron gluconate dihydrate (Sigma-Aldrich, 98% purity) were dissolved in 100 ml of deionized water (Millipore) to give a total metal ion concentration of 0.2 M. This solution was added slowly with stirring to a 1.2 M solution of sucrose (Acros Organics, 99+%) in deionized water. After a further 15 minutes of stirring at room temperature, the solvent was evaporated at 150° C. to 180° C. The solid obtained was then dried at 300° C. for 10-20 minutes. The dried solid was then roughly comminuted by hand, and heated in an air atmosphere at 450° C. for 3 hours. During this time, the temperature was increased in an oven (R50/250/12, Nabertherm) with a heating rate of about 2.5° C. to 3° C. min$^{-1}$, corresponding to a heating-up time of 2.5 hours. After the calcining, the sample obtained was briefly mortared by hand, giving a very fine powder after just about 30 seconds.

Figure 1:
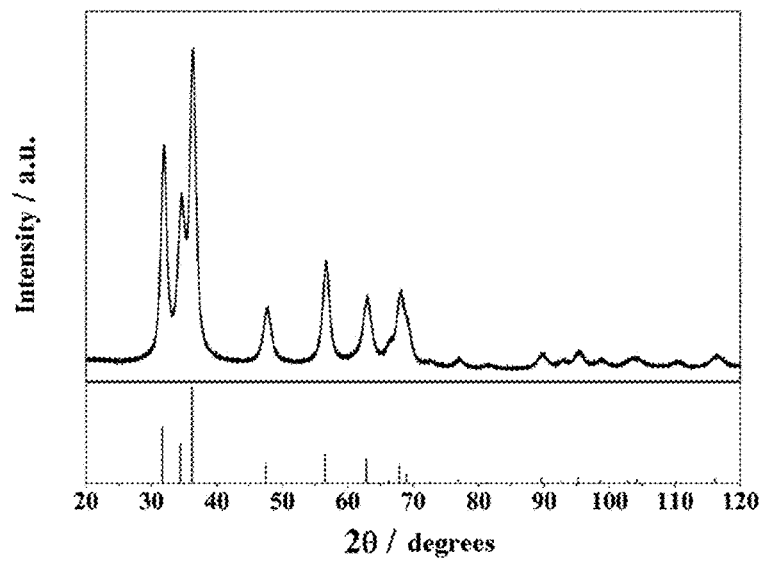
FIG. 1 shows X-ray diffractograms.
Figure 1:
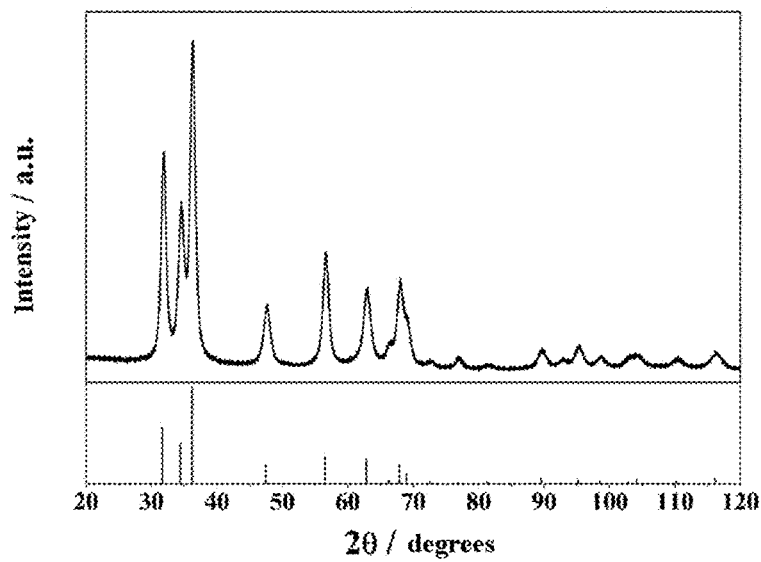

The morphology of the $Fe_{0.1}Zn_{0.9}O$ particles obtained after calcining was determined by X-ray powder diffractometry (XRD) using a Bruker D8 Advance (Cu-Kα radiation, λ=0.154 nm) X-ray diffractometer. FIG. 1a) shows the X-ray diffractogram of the particles obtained, and also the signals of the JCPDS file (Joint Committee of Powder Diffraction Standards) for $Co_{0.15}Zn_{0.85}O$ with P63mc space group (JCPDS 01-072-8025). As can be seen from FIG. 1a), the signals observed for the calcined $Fe_{0.1}Zn_{0.9}O$ particles were unambiguously assignable to the signals of $Co_{0.15}Zn_{0.85}O$, which has a virtually identical structure and was therefore utilized as reference, since there is no corresponding reference available for iron-doped zinc oxide.

b) Carbon Coating of the $Fe_{0.1}Zn_{0.9}O$ Particles 0.75 g of sucrose (Acros Organics, 99+%) was dissolved with stirring in 3.5 ml of deionized water. Then 1 g of the $Fe_{0.1}Zn_{0.9}O$ particles from step a) was added and the mixture was homogenized for 1.5 hours in a ball mill (Vario-Planetary Mill Pulverisette 4, Fritsch) at 800 rpm. The resulting mixture was dried in the air at 80° C. overnight and then heated in an argon atmosphere at 500° C. for 4 hours with a heating rate of about 3° C. min$^{-1}$. The solid obtained was then mortared by hand.

The morphology of the carbon-coated $Fe_{0.1}Zn_{0.9}O$ particles ($Fe_{0.1}Zn_{0.9}O$—C) was determined again by X-ray powder diffractometry. FIG. 1b) shows the X-ray diffractogram of the carbon-coated particles obtained, and also the signals of the JCPDS file for $Co_{0.15}Zn_{0.85}O$. As can be seen from FIG. 1b), the signals observed for the carbon-coated particles again corresponded unambiguously to the signals of $Co_{0.15}Zn_{0.85}O$, whose crystal structure is virtually identical to that of $Fe_{0.1}Zn_{0.9}O$. This shows that the carbonizing with sucrose has not adversely affected the phase purity of the $Fe_{0.1}Zn_{0.9}O$ particles. The absence of further reflections such as for graphitic carbon shows additionally that a coating of amorphous carbon has been formed.

The presence of carbon was confirmed by means of CHN elemental analysis (CHN-O-Rapid, Heraeus). The fraction of carbon was determined by thermogravimetric analysis (TGA) under $O_2$ (TA Instruments Q5000) to be 18.6 wt %, based on the total weight of the particles.

Figure 2:
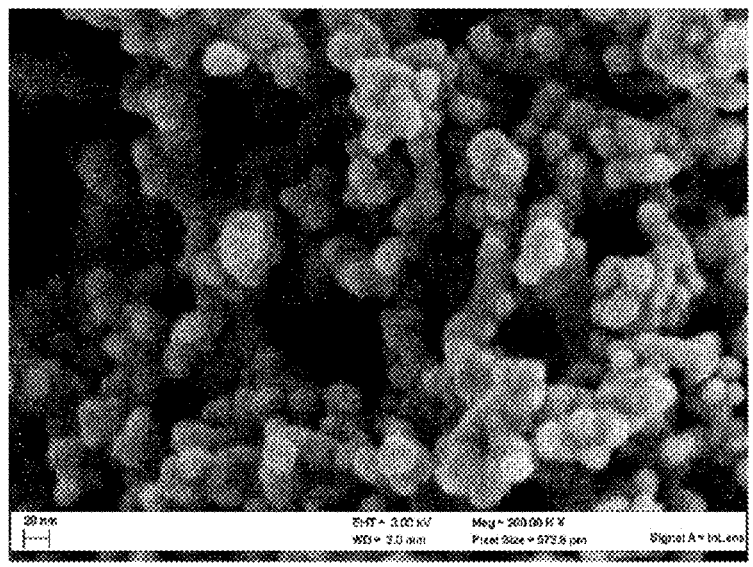
FIG. 2 shows scanning electron micrographs (200 000× magnification) of the $Fe_{0.1}Zn_{0.9}O$ particles obtained after calcining, in FIG. 2a) and also, in FIG. 2b), shows the carbon-coated $Fe_{0.1}Zn_{0.9}O$ particles obtained after carbonizing with sugar.
Figure 2:
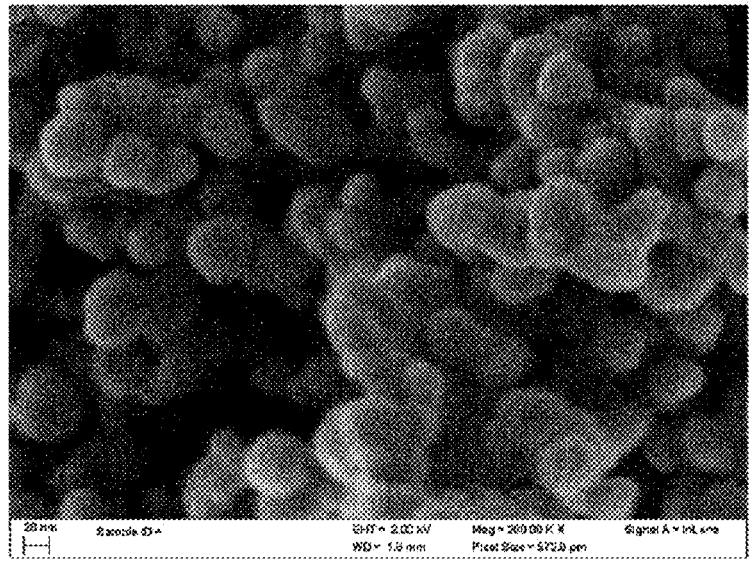

FIG. 2a) shows further a scanning electron micrograph (ZEISS Auriga® electron microscope, 200 000 times magnification) of the nanoparticulate $Fe_{0.1}Zn_{0.9}O$ obtained after calcining, while FIG. 2b) shows the carbon-coated $Fe_{0.1}Zn_{0.9}O$ particles obtained after carbonizing with sugar. From the scanning electron micrograph, the average diameter of the $Fe_{0.1}Zn_{0.9}O$ particles was determined as being about 20 nm to 30 nm. A comparison of the micrographs shows that the particle size after carbonizing was still in the range from 25 nm to 40 nm and was therefore largely preserved even after the carbon coating procedure.

Example 2

Production of $Co_{0.1}Zn_{0.9}O$ Particles

Stoichiometric amounts of 4.102 g of zinc(II) gluconate hydrate (ABCR, 97% purity) and 0.449 g of cobalt(II) gluconate dihydrate (ABCR, >97% purity) were dissolved in 50 ml of deionized water (Millipore) to give a total metal ion concentration of 0.2 M. This solution was added slowly with stirring to a 1.2 M solution of sucrose (Acros Organics, 99+% purity) in deionized water. After a further 15 minutes of stirring at room temperature, the solvent was evaporated at 150° C. to 180° C. The solid obtained was then dried at 300° C. for 10 to 20 minutes. The dried solid was then roughly comminuted by hand, and heated in an air atmosphere at 400° C. for 3 hours. During this time, the temperature was increased in an oven (R50/250/12, Nabertherm) with a heating rate of about 2.5° C. to 3° C. min$^{-1}$, corresponding to a heating-up time of 2.5 hours.

Figure 3:
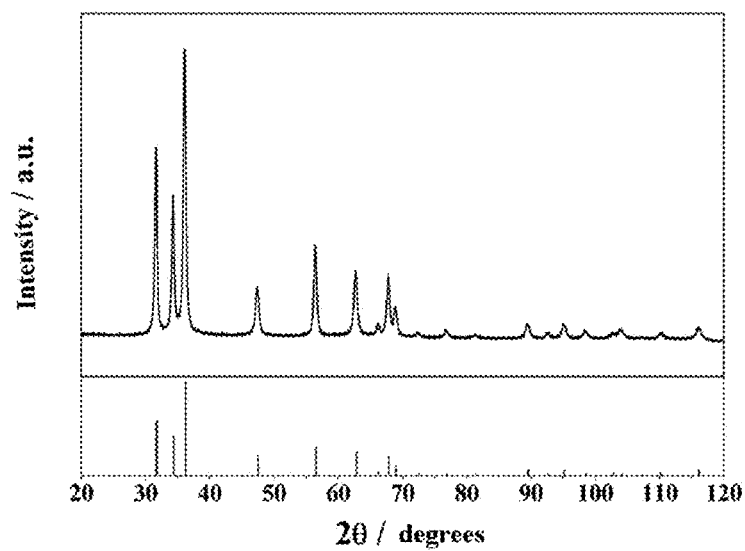
FIG. 3 shows in FIG. 3a) the X-ray diffractogram of the $Co_{0.1}Zn_{0.9}O$ particles and also the signals of the JCPDS file of $Co_{0.15}Zn_{0.85}O$, and also, in FIG. 3b), shows a scanning electron micrograph (200 000× magnification) of the $Co_{0.1}Zn_{0.9}O$ particles.
Figure 3:
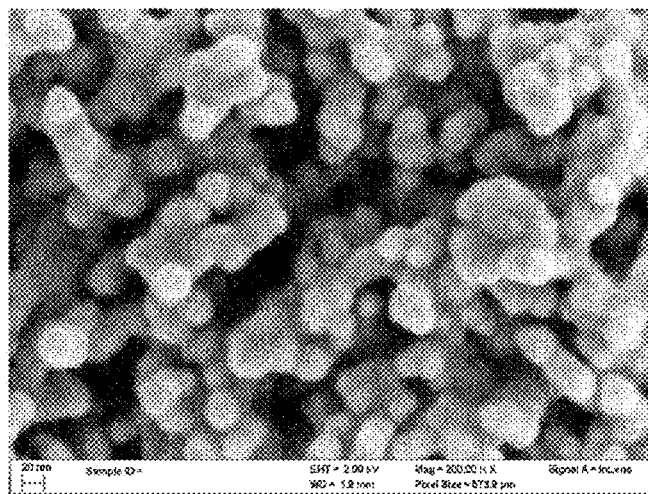

The morphology of the $Co_{0.1}Zn_{0.9}O$ particles was determined by X-ray powder diffractometry (XRD) using a Bruker D8 Advance (Cu-Kα radiation, λ=0.154 nm) X-ray diffractometer. FIG. 3a) shows the X-ray diffractogram and also the signals of the JCPDS file (Joint Committee of Powder Diffraction Standards) for $Co_{0.15}Zn_{0.85}O$ with P63mc space group (JCPDS 01-072-8025). As can be seen from FIG. 3a), the signals observed for the calcined particles were unambiguously assignable to the signals of $Co_{0.15}Zn_{0.85}O$, which serves in this case too as a reference, since the crystal structure is therefore virtually identical and there is no in-house reference available for $Co_{0.1}Zn_{0.9}O$.

FIG. 3b) shows a scanning electron micrograph (ZEISS Auriga® electron microscope, 200 000 times magnification) of the $Co_{0.1}Zn_{0.9}O$ particles obtained. From the micrograph, the average diameter of the $Co_{0.1}Zn_{0.9}O$ particles was determined as being about 25 nm to 40 nm.

Example 3

Production of ZnO Particles 4.558 g of zinc(II) gluconate hydrate (ABCR, 97% purity) were dissolved in 50 ml of deionized water (Millipore) to a metal ion concentration of 0.2 M. This solution was added slowly with stirring to a 1.2 M solution of sucrose (Acros Organics, 99+% purity) in deionized water. After a further 15 minutes of stirring at room temperature, the solvent was evaporated at 150° C. to 180° C. The resulting solid was then dried at 300° C. for 10 to 20 minutes. The dried solid was then roughly comminuted by hand and heated under an air atmosphere at 450° C. for 3 hours. During this time the temperature was increased in an oven (R50/250/12, Nabertherm) with a heating rate of about 2.5° C. to 3° C. min$^{-1}$, corresponding to a heating-up time of 2.5 hours.

Figure 4:
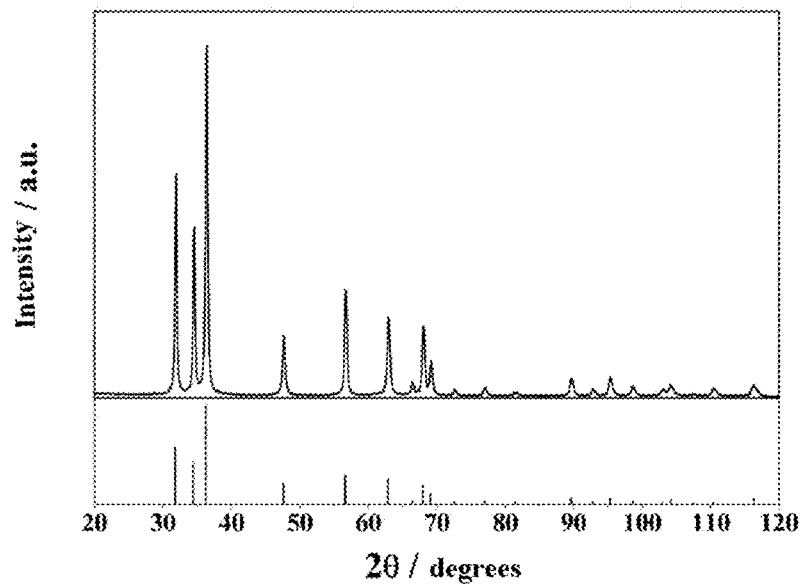
FIG. 4 shows in FIG. 4a) the X-ray diffractogram of the ZnO particles and also the signals of the JCPDS file of ZnO, and also, in FIG. 4b), shows a scanning electron micrograph (200 000× magnification) of the ZnO particles.
Figure 4:
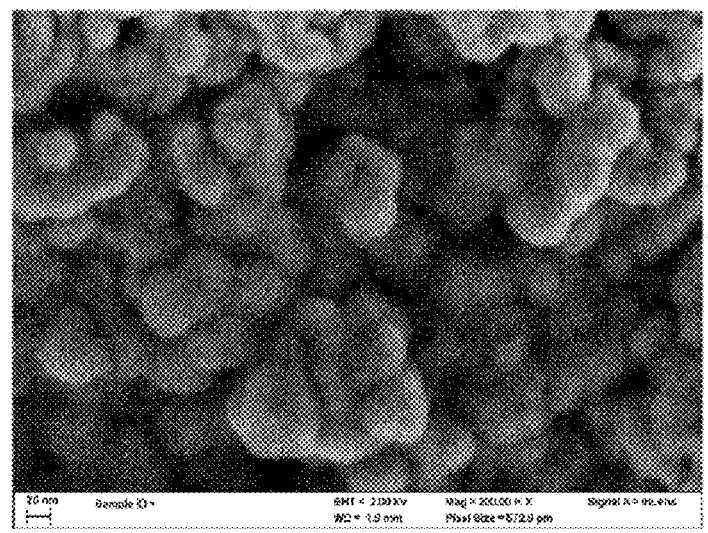

The morphology of the ZnO particles was determined by X-ray powder diffractometry (XRD) using a Bruker D8 Advance (Cu-Kα radiation, λ=0.154 nm) X-ray diffractometer. FIG. 4a) shows the X-ray diffractogram of the particles obtained, and also the signals of the JCPDS (Joint Committee of Powder Diffraction Standards) file for ZnO with P63mc space group (JCPDS 01-071-6424). As can be seen from FIG. 4a), the signals observed for the calcined particles were clearly assignable to the signals of ZnO. FIG. 4b) shows a scanning electron micrograph (ZEISS Auriga® Electron microscope, 200 000 times magnification) of the ZnO particles obtained. From the micrograph, the average diameter of the ZnO particles was determined as being about 25 nm to 40 nm.

Example 4

Electrode Production

For the production of electrodes, the uncoated and carbon-coated $Fe_{0.1}Zn_{0.9}O$ particles produced according to examples 1a and 1b, and also the uncoated $Co_{0.1}Zn_{0.9}O$ and ZnO particles produced according to examples 2 and 3, were used with conductive carbon and carboxymethylcellulose (CMC) as binder, in a weight ratio of 75:20:5.

First of all, sodium carboxymethylcellulose (CMC, WALOCEL™ CRT 2000 PPA 12, Dow Wolff Cellulosics) was dissolved in deionized water, giving a solution containing 1.25 wt % of carboxymethylcellulose. The particles produced according to examples 1 to 3 and Super P® conductive carbon (TIMCAL®, Switzerland) as conductivity additive were added and the mixture was homogenized using a ball mill (Vario-Planetary Mill Pulverisette 4, Fritsch) at 800 rpm for 2 hours. The suspension thus obtained was applied with a doctor blade, with a wet film thickness of 120 μm, to copper foil (Schlenk). The electrode was dried in air at 80° C. for 2 hours and then at room temperature (20±2° C.) for 12 hours.

Subsequently, circular electrodes with a diameter of 12 mm and an area of 1.13 cm$^2$ were punched out and dried under reduced pressure at 120° C. for 12 hours. The surface coverage was approximately 1.8 to 2.2 mg cm$^{-2}$. The surface coverage was determined by weighing of the pure foil and of the electrodes punched out.

Electrochemical Investigations

The electrochemical investigation of the electrodes produced according to example 4 took place in three-electrode Swagelok™ cells with lithium metal foils (Chemetall, "battery grade" purity) as counter electrodes and reference electrodes, or, in example 9, with sodium metal foils as counter electrode and reference electrode. The cell was assembled in a Glovebox (MBraun) filled with an inert argon gas atmosphere and having an oxygen content and water content of less than 0.5 ppm. An electrolyte-impregnated stack of nonwoven polypropylene web (Freudenberg, FS2226) was used as separator in a 1 M solution of $LiPF_6$ in a 3:7 mixture, based on the weight, of ethylene carbonate and diethyl carbonate ("battery grade" purity, UBE, Japan) as electrolyte.

Because lithium foil was used as counterelectrode and reference electrode, the reported voltages are based on the $Li^+/Li$ reference. Only in example 9 are the reported voltages based on the $Na^+/Na$ reference. All Electrochemical investigations were conducted at a temperature of 20° C.±2° C. The potentiostat/galvanostat used was a Maccor 4300 battery test system.

Comparative Example 5

Electrochemical Investigation of the Comparative Electrode Based on ZnO

In the first cycle, the cells were discharged and charged with a constant current density of 0.024 A/g to a cut-off potential of 0.01 V and 3.0 V respectively. Thereafter, for 10 cycles in each case, a current density of 0.048; 0.095; 0.19; 0.48; 0.95; 1.90; 4.75; and 9.50 A/g was applied to the electrodes and the cell was discharged and charged to a potential of 0.01 V and 3.0 V respectively. The applied current density was then lowered again to 0.095 A/g.

Figure 5:
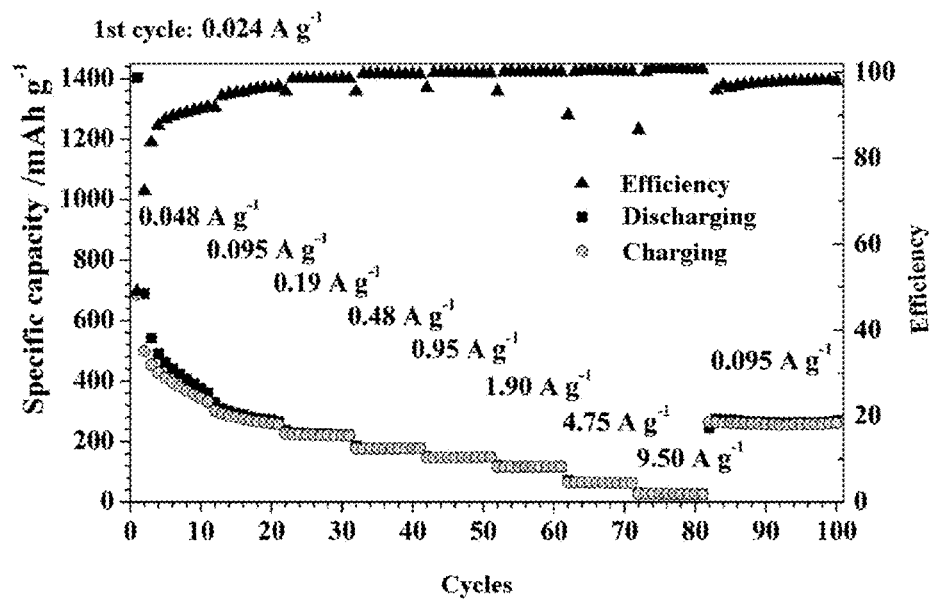
FIG. 5 shows the capacity characteristics of a composite electrode comprising zinc(II) oxide particles over 100 cycles with increasing charge and discharge rates.

FIG. 5 shows the capacity characteristics of the composite electrode comprising ZnO particles at rising charge and discharge rates over 100 cycles. At the start, the electrode showed a reversible specific capacity of about 685 mAh/g and an irreversible capacity loss of more than 700 mAh/g. The specific capacity obtained then dropped off rapidly, before stabilizing at above 200 mAh/g for an applied current density of 0.19 A/g. When the applied current density was increased further in steps, the specific capacity obtained continued to drop off, before going to just above 0 mAh/g for an applied current density of 9.5 A/g. When the applied current density, finally, was lowered to 0.095 A/g again, a specific capacity of about 310 mAh/g was obtained, which corresponds approximately to the theoretical specific capacity of ZnO (329 mAh/g), if the zinc present just forms an alloy with lithium reversibly.

Example 6

Electrochemical Investigation of an Electrode Containing $Fe_{0.1}Zn_{0.9}O$ Particles In the first cycle, the cells were discharged and charged with a constant current density of 0.024 A/g to a cut-off potential of 0.01 V and 3.0 V respectively. In analogy to example 5, thereafter, for 10 cycles in each case, a current density of 0.048; 0.095; 0.19; 0.48; 0.95; 1.90; 4.75; and 9.50 A/g was applied to the electrodes and the cell was discharged and charged to a potential of 0.01 V and 3.0 V respectively. The applied current density was then lowered again to 0.095 A/g.

Figure 6:
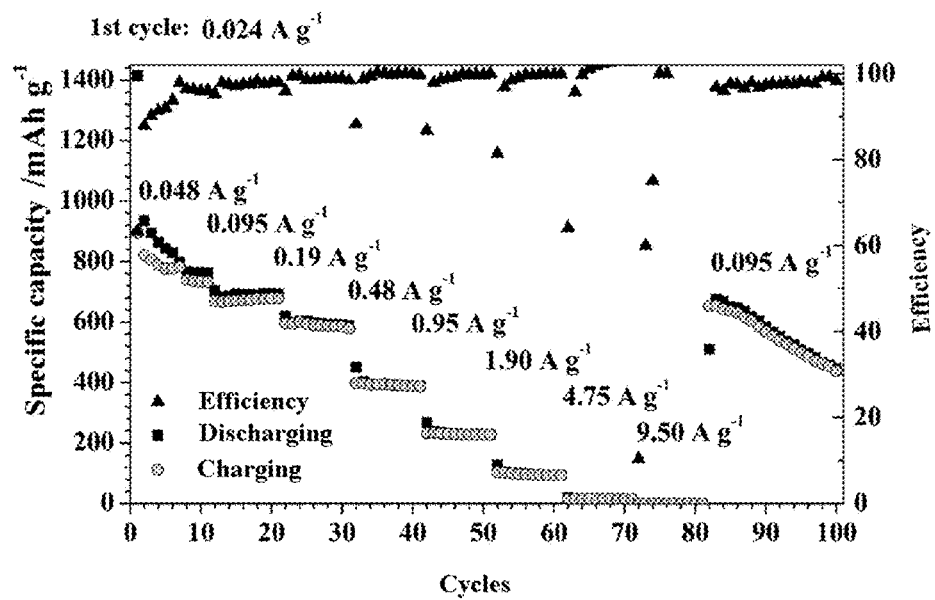
FIG. 6 shows the capacity characteristics of a composite electrode comprising $Fe_{0.1}Zn_{0.9}O$ particles over 100 cycles with increasing charge and discharge rates.

FIG. 6 shows the capacity characteristics of the composite electrode comprising $Fe_{0.1}Zn_{0.9}O$ particles at rising charge and discharge rates over 100 cycles. At the start, the electrode showed a reversible specific capacity of about 900 mAh/g and an irreversible capacity loss of about 500 mAh/g. The specific capacity obtained then dropped off slightly to start with, before stabilizing at about 730 mAh/g for an applied current density of 0.048 A/g. When the applied current density was increased further in steps, the specific capacity obtained dropped off gradually, before going to 0 mAh/g for an applied current density of 9.5 A/g. When the applied current density, finally, was lowered to 0.095 A/g again, a specific capacity of about 650 mAh/g was obtained, which corresponds approximately to twice the theoretical specific capacity of ZnO (329 mAh/g), but dropped off continuously thereafter.

The electrodes therefore exhibited a cycling stability and specific capacity improved significantly relative to ZnO.

Example 7

Electrochemical Investigation of an Electrode Containing Carbon-Coated $Fe_{0.1}Zn_{0.9}O$ Particle Particles In the first cycle, the cells were discharged and charged with a constant current density of 0.024 A/g to a cut-off potential of 0.01 V and 3.0 V respectively. In analogy to examples 5 and 6, thereafter, for 10 cycles in each case, a current density of 0.048; 0.095; 0.19; 0.48; 0.95; 1.90; 4.75; and 9.50 A/g was applied to the electrodes and the cell was discharged and charged to a potential of 0.01 V and 3.0 V respectively. The applied current density was then lowered again to 0.095 A/g.

Figure 7:
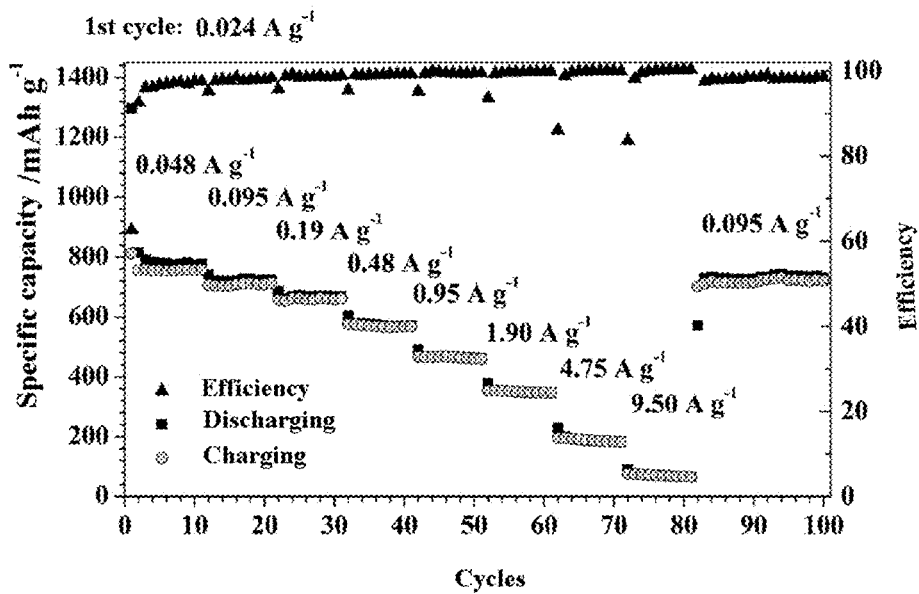
FIG. 7 shows the capacity characteristics of a composite electrode comprising carbon-coated $Fe_{0.1}Zn_{0.9}O$ particles over 100 cycles with increasing charge and discharge rates.

FIG. 7 shows the capacity characteristics of the composite electrode carbon-coated $Fe_{0.1}Zn_{0.9}O$ particles on increasing charge and discharge rates over 100 cycles. At the start, the electrode showed a reversible specific capacity of about 810 mAh/g and an irreversible capacity loss of about 450 mAh/g. The cycling stability was significantly improved relative to the uncoated particles and also to the zinc oxide reference. In relation to shortened charging times and/or higher applied current densities as well, a significant improvement in the material was achieved. Thus, for example, even for an applied current density of 1.9 A/g, a specific capacity of about 350 mAh/g was obtained, which corresponds approximately to the theoretical capacity of graphite (372 mAh/g), but which as a general rule is not achieved for the same current density (corresponding to a charge rate of 5 C, meaning that the cell was fully charged or discharged in about 12 minutes)

Where, lastly, the applied current density was lowered to 0.095 A/g again, an extremely stable specific capacity of about 730 to 740 mAh/g was obtained, which corresponded to more than twice the theoretical specific capacity of ZnO (329 mAh/g) and approximately to twice the theoretical specific capacity of graphite (372 mAh/g).

The electrodes therefore showed, over all of the current densities applied, a cycling stability and specific capacity improved significantly relative to ZnO and also relative to the uncoated $Fe_{0.1}Zn_{0.9}O$ particles.

Example 8

Electrochemical Investigation of an Electrode Comprising $Co_{0.1}Zn_{0.9}O$ Particles In the first cycle, the cells were discharged and charged with a constant current density of 0.024 A/g to a cut-off potential of 0.01 V and 3.0 V respectively. Thereafter, a current density of 0.048 and 0.095 A/g was applied to the electrodes, for 10 cycles in each case, and the cell was discharged and charged to a potential of 0.01 V and to 3.0 V respectively.

Figure 8:
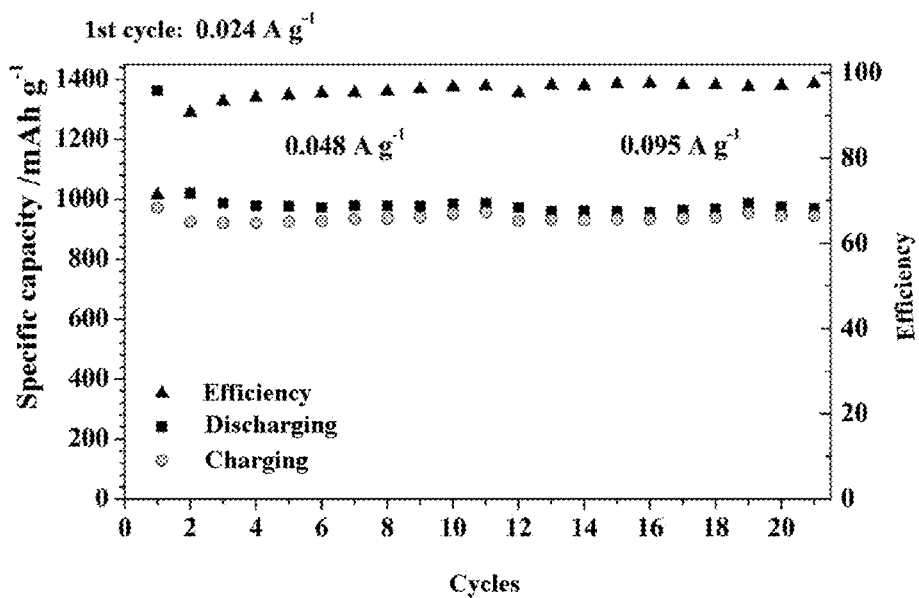
FIG. 8 shows the capacity characteristics of a composite electrode comprising $Co_{0.1}Zn_{0.9}O$ particles over 21 cycles with increasing charge and discharge rates.

FIG. 8 shows the capacity characteristics of the composite electrode comprising $Co_{0.1}Zn_{0.9}O$ particles on increasing charge and discharge rates over 21 cycles. At the start, the electrode showed a reversible specific capacity of about 970 mAh/g and an irreversible capacity loss of about 370 to 380 mAh/g. The cycling stability was therefore improved further relative to the uncoated $Fe_{0.1}Zn_{0.9}O$ particles and also to the zinc oxide reference. When the applied current density was doubled, in each case after ten cycles, the specific capacity obtained remained approximately constant at about 940 mAh/g, and was therefore almost three times as high as the theoretical capacity of ZnO (329 mAh/g) and also higher by a factor of 2.5 than the theoretical capacity of graphite (372 mAh/g).

The electrodes therefore exhibited a cycling stability and specific capacity substantially better than for ZnO. The specific capacity and cycling stability of the electrode based on $Co_{0.1}Zn_{0.9}O$ are likewise better than those of the electrode based on uncoated $Fe_{0.1}Zn_{0.9}O$ particles.

Example 9

Electrochemical Investigation of an Electrode Comprising Carbon-Coated $Fe_{0.1}Zn_{0.9}O$ Particles Against Sodium Metal In the first cycle, the cells were discharged and charged with a constant current density of 0.1 A/g to a cut-off potential of 0.01 V and 3.0 V respectively.

Figure 9:
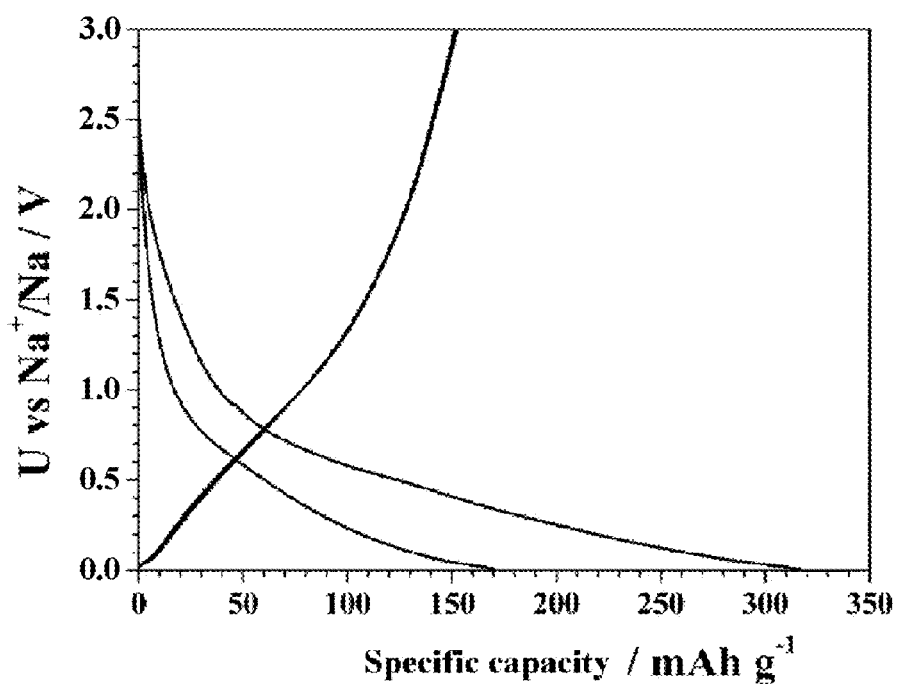
FIG. 9 shows the voltage profile of a composite electrode comprising carbon-coated $Fe_{0.1}Zn_{0.9}O$ particles against metallic sodium.

FIG. 9 shows the voltage profile of the composite electrode comprising carbon-coated $Fe_{0.1}Zn_{0.9}O$ particles for the first two cycles. At about 150 mAh/g, the specific capacity obtained was indeed well below the specific capacity obtainable when using lithium-based systems, but is at least comparable with the current standard anode materials for sodium-based battery systems, for which cost advantages are generally rated higher than high energy densities.

As can be seen from the complete overlap of the two charging operations, the storage of sodium ions in electrodes produced accordingly was highly reversible, moreover.

Against sodium metal as well, therefore, the electrodes based on coated $Fe_{0.1}Zn_{0.9}O$ particles exhibit a stable specific capacity and are therefore generally also suitable as a new anode material for sodium ion-based battery systems.

Example 10

Production of Carbon-Coated $Fe_xZn_{1-x}O$ Particles with Varying Iron Content $Fe_xZn_{1-x}O$ particles were produced as described in example 1, step a), with the stoichiometric amounts of zinc(II) gluconate hydrate and iron gluconate dihydrate being adapted so as to give calcined $Fe_{0.02}Zn_{0.98}O$ particles, $Fe_{0.04}Zn_{0.96}O$ particles, $Fe_{0.06}Zn_{0.94}O$ particles, $Fe_{0.08}Zn_{0.92}O$ particles, $Fe_{0.1}Zn_{0.9}O$ particles, and $Fe_{0.12}Zn_{0.88}O$ particles.

Determination of the morphology by X-ray powder diffractometry revealed all of the samples to be phase-pure with a particle crystallinity that dropped slightly as the iron content went up.

Determinations were also made of the BET surface area of the particles and of their density, For this purpose, the specific surface area of solids was determined by means of nitrogen gas adsorption by the Brunauer-Emmett-Teller (BET) method. For this purpose an ASAP 2020 (Accelerated Surface Area and Porosimetry Analyzer, Micromeritics) was used. The density of the samples analyzed was determined using an AccuPyc II 1340 Gas Pycnometer (Micromeritics, helium).

The BET surface area and density found in the samples are collated Table 1 below:

TABLE 1

| Sample | BET surface area [m²/g] | Density [g/cm³] |
| --- | --- | --- |
| $Fe_{0.12}Zn_{0.88}O$ | 98 ± 0.3 | 5.5 ± 0.1 |
| $Fe_{0.1}Zn_{0.9}O$ | 88 ± 0.3 | 5.4 ± 0.1 |
| $Fe_{0.08}Zn_{0.92}O$ | 80 ± 0.1 | 5.4 ± 0.1 |
| $Fe_{0.06}Zn_{0.94}O$ | 74 ± 0.1 | 5.3 ± 0.1 |
| $Fe_{0.04}Zn_{0.96}O$ | 64 ± 0.1 | 5.4 ± 0.1 |
| $Fe_{0.02}Zn_{0.98}O$ | 47 ± 0.1 | 5.5 ± 0.1 |

It was found that the density of the particles was in each case close to the density of ZnO, of 5.6 g/cm³.

The particles were subsequently coated with about 20 wt % of carbon, based on the weight of the particles, by mixing them with sucrose and carrying out carbonization, as described in example 1, step b).

Example 11

Electrochemical Investigation of Electrodes Containing Carbon-Coated $Fe_xZn_{1-x}O$ Particles with Varying Iron Content Carbon-coated $Fe_{0.06}Zn_{0.94}O$, $Fe_{0.08}Zn_{0.92}O$, $Fe_{0.1}Zn_{0.9}O$ and $Fe_{0.12}Zn_{0.88}O$ particles produced according to example 10 were used for the electrochemical investigation. Electrode production took place as described in example 4.

In the first cycle in each case, the cells were discharged and charged with a constant current density of 0.05 A/g (1 C≙1 A/g) to a cut-off potential of 0.01 V and 3.0 V respectively. Thereafter, for ten cycles in each case, a current density of 0.05; 0.1; 0.2; 0.5; 1; 2 and 5 A/g was applied to the electrodes, and the cell was discharged and charged to a potential of 0.01 V and to 3.0 V respectively. The applied current density was then lowered again to 0.1 A/g.

Figure 10:
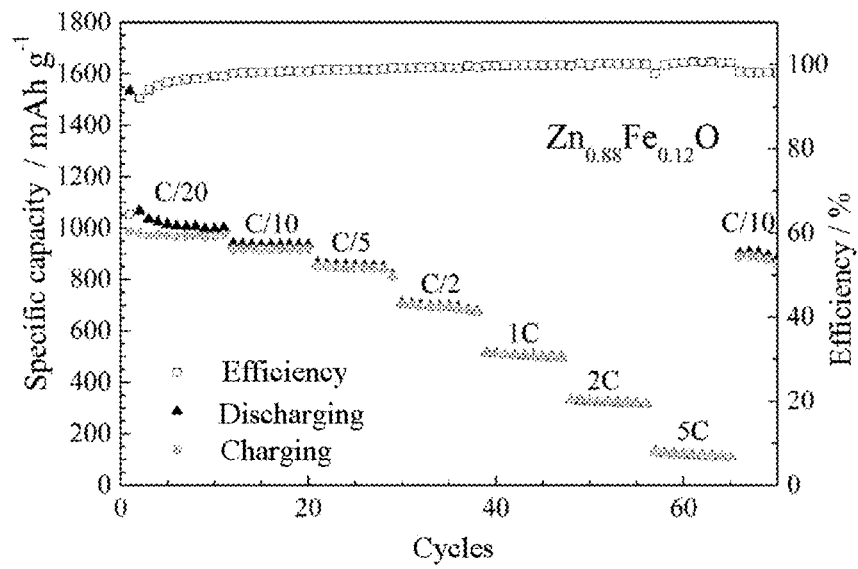
FIG. 10 shows the capacity characteristics of composite electrodes comprising carbon-coated $Fe_xZn_{1-x}O$ particles over 70 cycles with increasing charge and discharge rates. In this figure, FIG. 10a) shows the capacity characteristics of $Fe_{0.12}Zn_{0.88}O$ particles, FIG. 10b) that of $Fe_{0.1}Zn_{0.9}O$ particles, FIG. 10c) that of $Fe_{0.08}Zn_{0.92}O$ particles and FIG. 10d) that of $Fe_{0.06}Zn_{0.94}O$ particles.
Figure 10:
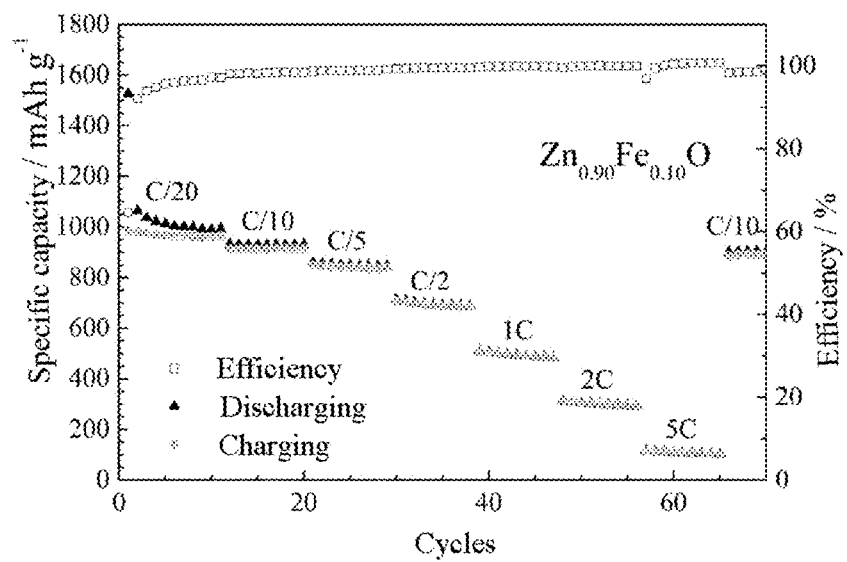
Figure 10:
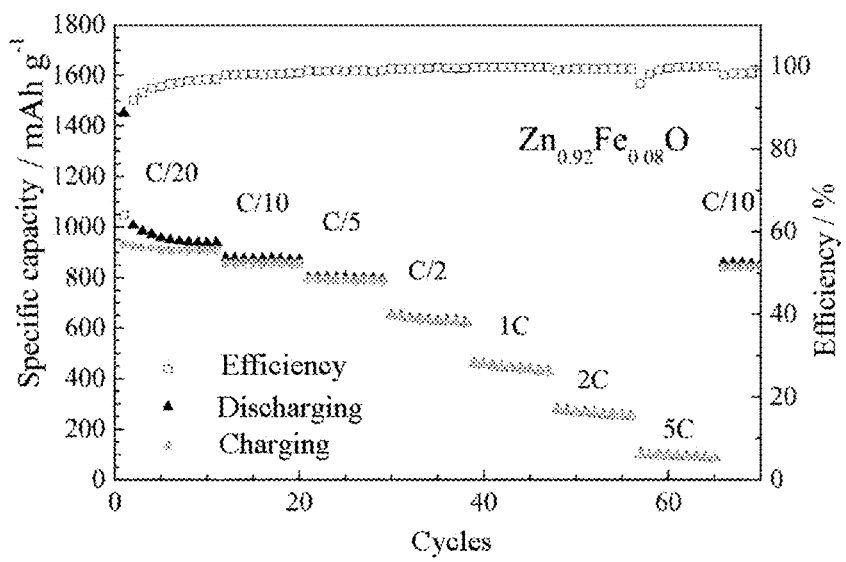
Figure 10:
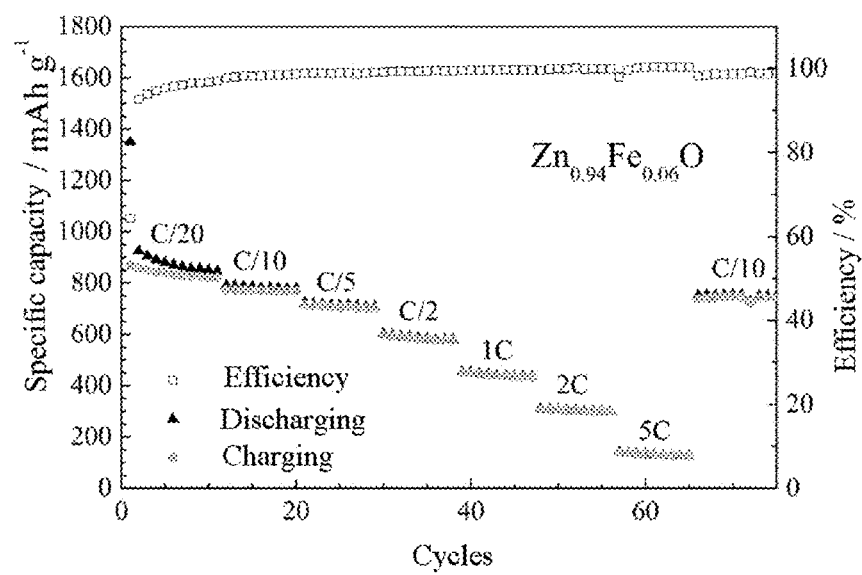

FIG. 10 shows the capacity characteristics of the composite electrodes comprising the carbon-coated $Fe_xZn_{1-x}O$ particles on increasing charge and discharge rates over 70 cycles. Here, FIG. 10a) shows the capacity characteristics of the $Fe_{0.12}Zn_{0.88}O$ particles, FIG. 10b) those of the $Fe_{0.1}Zn_{0.9}O$ particles, FIG. 10c) those of the $Fe_{0.08}Zn_{0.92}O$ particles, and FIG. 10d) those of the $Fe_{0.06}Zn_{0.94}O$ particles. A comparison shows that for these particles, a higher iron content generally had a positive influence on the specific capacity achieved, for all discharge rates.

As can be inferred from FIG. 10, the electrodes comprising particles having an iron content in the range from $Fe_{0.08}Zn_{0.92}O$ to $Fe_{0.12}Zn_{0.88}O$ all exhibited a very good specific capacity and cycling stability over the current densities applied.

Example 12

Production of Carbon-Coated $Fe_{0.1}Zn_{0.9}O$ Particles with Varying Carbon Content $Fe_{0.1}Zn_{0.9}O$ particles were produced as described in example 1, step a), and subsequently coated with carbon as described in example 1, step b), by mixing them with sucrose and carrying out carbonization, the amounts of sucrose being adapted so as to give $Fe_{0.1}Zn_{0.9}O$ particles coated in each case with 5 wt %, 12 wt %, 16 wt %, and 20 wt % of carbon, based on the total weight of the particles.

The morphology of the uncoated and coated particles was subsequently determined by X-ray powder diffractometry. It was found that the crystallinity of the particles rose with falling carbon content. Furthermore, the BET surface area of the particles and their density were determined as described in example 10. The BET surface area and density determined for the particles are collated in Table 2 below:

TABLE 2

| Sample | Carbon content [wt %] | BET surface area [m²/g] | Density [g/cm³] |
|---|---|---|---|
| $Fe_{0.1}Zn_{0.9}O$ | 20 | 92 ± 2.1 | 3.6 ± 0.1 |
| $Fe_{0.1}Zn_{0.9}O$ | 16 | 98 ± 1.6 | 3.7 ± 0.1 |
| $Fe_{0.1}Zn_{0.9}O$ | 12 | 79 ± 0.8 | 4.2 ± 0.1 |
| $Fe_{0.1}Zn_{0.9}O$ | 5 | 62 ± 0.2 | 4.9 ± 0.1 |
| $Fe_{0.1}Zn_{0.9}O$ | 0 | 88 ± 0.3 | 5.4 ± 0.1 |

It was found that the BET surface area varied, with the specific surface area in a range from ≥12 wt % to ≤20 wt % of carbon being higher than for 5 wt % of carbon, whereas the density rose with falling carbon content. This shows that particles having a carbon fraction in the range from 5 wt % to 20 wt %, especially in the range from 12 wt % to 20 wt %, hold out the expectation overall of a good active material for electrodes with high capacity.

The research which led to this invention was supported by external funding from the Seventh Framework Programme of the European Union (FP72007-2013) under Project No. ORION 229036.

The invention claimed is:

1. A method for producing carbon-coated particles of $M_xZn_{1-x}O$ wherein M is a transition metal selected from the group comprising Fe, Co, Ni, Mn and/or Cu and 0.02≤x≤0.14, comprising the following steps:
   a) mixing stoichiometric amounts of a Zn salt and of a transition metal salt with a sugar in a solvent;
   b) drying the mixture from step a);
   c) calcining the dried mixture from step b);
   d) mixing the $M_xZn_{1-x}O$ particles obtained from step c) with a sugar in a solvent;
   e) carbonizing the mixture from step d).

2. The method as claimed in claim 1, characterized in that the Zn salt is an organic salt selected from the group comprising gluconates, citrates, acetates, formats, butyrates, lactates, glycolates, tartrates, propionates, and succinates.

3. The method as claimed in claim 1, characterized in that the calcining is performed at a temperature in the range from ≥300° C. to ≤500° C.

4. The method as claimed in claim 1, characterized in that the carbonizing is performed at a temperature in the range from ≥350° C. to ≤700° C.

5. Carbon-coated particles of $M_xZn_{1-x}O$ wherein M is a transition metal selected from the group comprising Fe, Co, Ni, Mn and/or Cu and 0.02≤x≤0.14, obtainable by a method as claimed in claim 1.

6. The method as claimed in claim 2, wherein the Zn salt is a gluconate.

7. The method as claimed in claim 1, characterized in that the calcining is performed at a temperature in the range from ≥350° C. to ≤450° C.

8. The method as claimed in claim 1, characterized in that the calcining is performed at a temperature in the range from ≥400° C. to ≤450° C.

9. The method as claimed in claim 1, characterized in that the carbonizing is performed at a temperature in the range from ≥400° C. to ≤600° C.

10. The method as claimed in claim 1, characterized in that the carbonizing is performed at a temperature in the range from ≥450° C. to ≤550° C.

11. The method as claimed in claim 1, characterized in that the transition metal salt is an organic salt selected from the group comprising gluconates, citrates, acetates, formats, butyrates, lactates, glycolates, tartrates, propionates, and succinates.

12. The method as claimed in claim 1, characterized in that the Zn salt and the transition metal salt are each an organic salt selected from the group comprising gluconates, citrates, acetates, formats, butyrates, lactates, glycolates, tartrates, propionates, and succinates.

13. The method as claimed in claim 11, wherein the transition metal salt is a gluconate.

14. The method as claimed in claim 12, wherein the Zn salt and the transition metal salt are each a gluconate.

* * * * *